United States Patent Office 2,909,423
Patented Oct. 20, 1959

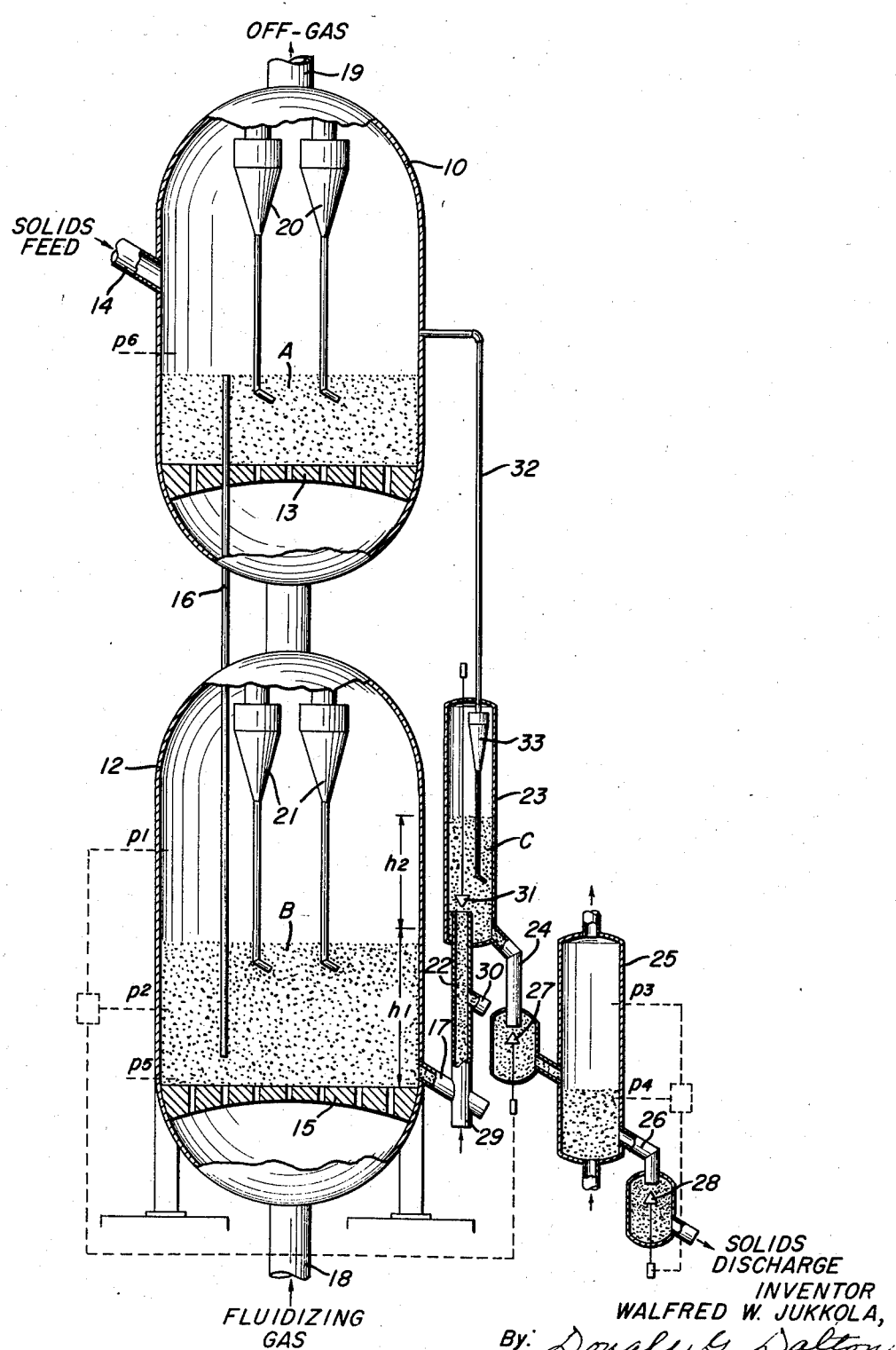

2,909,423

METHOD AND APPARATUS FOR HANDLING FLUIDIZED SOLIDS

Walfred W. Jukkola, Westport, Conn., assignor, by mesne assignments, to United States Steel Corporation, Pittsburgh, Pa., a corporation of New Jersey Application June 4, 1957, Serial No. 663,515

13 Claims. (Cl. 75—26)

This invention relates to an improved method and apparatus for handling finely divided solids discharging from a fluidized bed.

The invention is applicable generally to installations in which a fluidizing gas contacts finely divided solids in two or more successive beds on a continuous basis, off-gas from the bed last with respect to the direction of solids flow is used in a preceding bed, and solids from said last bed subsequently contact a gas which must be excluded from the beds. One example is in direct reduction of iron ore in which preheated ore feeds continuously to a first bed where it is partially reduced, and thence to a second bed where it is reduced more completely. Preheated reducing gas (for example hydrogen) is introduced continuously to the second bed and thence passes to the first bed counter to the ore flow. Reduced iron powder discharges from the second bed and commonly is treated in a stripping tower and briquetted. A stripping gas, such as nitrogen, contacts the iron powder in the stripping tower to remove traces of reducing gas, but there must be a seal between the stripping tower and the beds both to exclude stripping gas from the beds and to exclude reducing gas from the stripping tower.

One difficulty in installations of this type is that they tend to become unduly high and pose serious space and construction problems. The height problem is most acute where the beds are located one above the other, and such installations commonly extend to a height of about 200 feet above ground level. When relatively coarse material (minus ⅜" or ¼") is treated, the reactor which houses the last bed usually has a bottom draw-off, in preference to an overflow type of discharge, to prevent an accumulation of coarse particles in the bottom of the bed. As is known, a bottom draw-off requires a special discharge means to maintain proper bed level and also to provide a seal for preventing gas flow between the subsequent treating vessel (e.g. stripping tower) and the bed. The draw-off, discharge means, and subsequent treating vessel, if positioned for downward gravity solids transfer, all tend to add even more height to the installation.

My invention concerns a method and means for conserving height and of course is most useful in installations where the height problem is greatest, that is, where the beds are located one above the other. Despite the greater height this arrangement generally is preferred over those in which the beds are located side-by-side, since it simplifies handling the materials. Nevertheless it is apparent the principles of my invention can apply also to side-by-side bed arrangements. Consequently I intend the terms "lower" and "upper" as used herein to refer to direction of solids flow rather than to physical location; that is, "lower bed" refers to the last bed of a series from which solids discharge before going to a vessel for a second treatment (e.g. stripping), while "upper bed" refers to a preceding bed.

A previously known expedient for decreasing the total height is to include an intermediate standpipe between the bottom draw-off and the stripping tower. The standpipe and lower reactor in effect form arms of a U-tube, whereby fluo-static pressure of solids in the reactor forces solids to rise in the standpipe. The apparent density of a mass of fluidized solids bears an inverse relation to the superficial gas velocity. By superficial gas velocity is meant the velocity at which the supplied gas would pass through the empty reactor or standpipe. Thus, if fluidizing gas passes through the standpipe at a higher superficial velocity than through the lower reactor, the apparent density of the bed in the reactor exceeds that of the column in the standpipe, whereby the column, due to the fluo-static pressure exerted by the denser bed, can attain a level even higher than the bed. This permits the lower reactor to be built closer to ground level by a distance approximately equal to the height of the column in the standpipe and still discharge solids to the stripper. The total height of the installation of course decreases correspondingly.

An object of the present invention is to provide an improved method and means for further decreasing the height of such installations.

Another object is to provide a method and means for raising the level of solids in the standpipe of such an installation above the level attainable through fluo-static pressure aided only by differences in density.

A more specific object is to provide a method and means which utilize pressure differences between the freeboard of an upper reactor and a lower reactor for further raising the level of solids in a standpipe, the upper portion of the standpipe being at the smaller pressure prevalent in the freeboard of the upper reactor.

In accomplishing these and other objects of the invention, I have provided improved details of structure, a preferred form of which is shown in the accompanying drawing, in which the single figure is a diagrammatic vertical sectional view of an apparatus embodying the present invention.

The figure shows conventional upper and lower reactors 10 and 12 which are illustrated as physically one above the other and, if desired, can be housed within a common vessel. The upper reactor 10 includes a horizontal perforate partition 13 which supports an upper bed A of fluidized solids continuously fed thereto through a conventional feeder 14 shows only schematically. The lower reactor 12 includes a similar partition 15 which supports a lower bed B continuously fed from the upper bed via a transfer pipe 16. Solids discharge continuously from the lower bed through a bottom draw-off pipe 17. Fluidizing gas is introduced continuously to the lower reactor below its plate 15 via an inlet 18, and ascending currents of this gas keep the bed B fluidized. Off-gas from the lower reactor enters the upper reactor below its plate 13 and similarly keeps the bed A fluidized. Off-gas from the upper reactor discharges through a pipe 19, and is handled in an appropriate fashion, depending on the operation involved. In the example of iron ore reduction, this gas would be regenerated for re-use in the reactors. Preferably the upper and lower reactors are equipped with cyclones 20 and 21 respectively through which the gas discharges and which recover entrained solids and return them to the respective beds.

A pipe 22 extends upwardly from the draw-off pipe 17 and leads to a standpipe 23, which may be an extension of pipe 22 or, as shown, a vessel of enlarged cross section. Fluo-static pressure of the lower bed B forces solids discharged therefrom into said standpipe, where they form a column C. A discharge pipe 24 extends downwardly from said standpipe and leads to a conventional stripping tower 25 which has a discharge pipe 26. The column C furnishes a seal to exclude stripping gas from the beds. Discharge valves 27 and 28 are located in the discharge pipes 24 and 26 respectively. Preferably these valves operate automatically in accordance with conventional practice. As indicated schematically in the drawing, valve 27 is controlled by difference in pressure between the freeboard of the lower reactor 12 and the lower bed B therein (designated $p1$ and $p2$ respectively). Similarly valve 28 is controlled by difference in pressure between the freeboard of the stripping tower 25 and the particles therein (designated $p3$ and $p4$ respectively). Solids which discharge through valve 28 go to any suitable processing equipment, such as a briquetting machine in the example of iron ore treatment.

Also as known in the art, pipe 22 has a gas inlet 29 at its lower end and preferably one or more intermediate gas inlets 30. A fluidizing gas compatible with that introduced to the reactors is introduced to pipe 22 via these inlets preferably in sufficient quantity to yield a superficial gas velocity in pipes 22 and 23 exceeding the superficial gas velocity in the reactors. Thus fluo-static pressure of the lower bed B aided only by a difference in apparent density elevates fluidized solids in the standpipe to a higher level than the bed in the lower reactor, as already explained. In the example of iron ore, the gas entering the standpipe preferably is of the same composition as the reducing gas entering the lower reactor, although at a lower temperature. The reactor gas commonly is preheated to about 1400 to 1600 F., while the standpipe gas is heated only by compression and heat exchange with off-gas from the upper reactor to a temperature of about 300 to 1000 F. The standpipe gas may also accomplish further reduction of the product therein. The greater density of the bed in the reactor over that of the column in the standpipe also tends to prevent gas from flowing from inlet 29 into the draw-off pipe 17. The upper end of pipe 22 preferably has a normally open manually operated shut-off valve 31.

In accordance with the present invention, a pressure transmitting conduit 32 is connected to the upper portion of the standpipe 23 and to some part of the reduction system beyond the upper bed A. In the illustration the conduit 32 is connected directly into the freeboard of the upper reactor 10, although equivalent results can be attained by connecting it farther along in the piping which handles off-gas from this reactor. The gas above the upper bed A is at a smaller pressure than that above the lower bend B since the pressure drops as the gas flows through the combined resistance offered by the lower cyclones 21, the upper partition 13 and the upper bed. Consequently the top of the column C in the standpipe is subjected to less pressure than the top of the lower bed B. This pressure difference forces the column C to rise to a higher level than can be attained by fluo-static pressure aided only by differences in density. Off-gas from the standpipe of course flows through the conduit 32 and commingles with that from the upper reactor; hence the need for using a compatible gas in the standpipe. Preferably the standpipe contains a cyclone 33 through which the off-gas passes to recover entrained solids and return them to the column.

As a specific example of the benefits which result from the present invention, an apparatus as described has been designed for direct reduction of iron ore. The apparatus is intended to operate with a bed in the lower reactor 12 feet deep and having an apparent density of 70 lb. per cu ft., and a column in the standpipe having an apparent density of 62.5 lb. per cu. ft. The pressure difference between the bottom of the lower bed and the freeboard above the upper bed (designated $p5$ and $p6$ respectively) is about 10 p.s.i.g. Approximately 5.8 p.s.i.g. of this difference is due to the weight of fluidized solids in the lower bed, and approximately 4.2 p.s.i.g. to the pressure drop as the gas flows through the various resistances. Fluo-static pressure of the lower bed forces the column of solids in the standpipe to rise to a height of 13.4 feet (designated $h1$). The formula for this determination is:

$$\text{Column height} = \frac{\text{bed density}}{\text{column density}} \times \text{bed depth}$$

The greater pressure on the upper face of the lower bed forces the column in the standpipe to rise an additional 9.6 feet (designated $h2$). The formula for this determination is $$\text{Additional height} = \frac{\text{pressure difference (p.s.i.g.)}}{\text{column density (lb. per cu. ft.)}} \times 144$$

The total gain over an arrangement in which the discharge valves and stripping tower are located beneath the lower reactor to receive solids by direct gravitational flow is the sum of the foregoing heights or about 23 feet. Thus the bottom reactor can be built 23 feet closer to the ground and the total height decreased correspondingly. About 9.6 feet thus gained can be attributed to the present invention.

While I have shown and described only a single embodiment of my invention, it is apparent that modifications may arise. Therefore, I do not wish to be limited to the disclosure set forth but only by the scope of the appended claims.

I claim:

1. In a process wherein a fluidizing gas acts on finely-divided solids in a plurality of zones containing fluidized beds through which such solids are successively passed to discharge from a final one of such beds; the improved method of transferring such discharged solids into a further vessel, comprising maintaining in a zone preceding said final bed a pressure lower than that prevalent at the point of solids discharge from the final bed, introducing solids discharged from the final bed into a vertically extending column of fluidized solids, increasing the elevation of such column by subjecting the upper face thereof to the lower pressure of said preceding zone and discharging solids from adjacent the upper face of such column at such increased elevation.

2. In a process wherein a fluidizing gas acts on finely divided solids successively in two beds and on a continuous basis, off-gas from a lower bed is used in an upper bed, gas above the upper bed being under less pressure than gas above the lower bed, and solids discharging from the lower bed form an upwardly extending fluidized column under the influence of fluo-static pressure of the lower bed, a method of increasing the height of said column above that attainable by fluo-static pressure alone comprising subjecting the upper face of the column to the smaller pressure prevalent above the upper bed.

3. A method as defined in claim 2 in which the column is maintained at a lower apparent density than the lower bed.

4. A method as defined in claim 2 in which the beds are located physically one above the other.

5. In a process wherein finely divided solids feed continuously to an upper bed and thence to a lower bed and discharge from the bottom of said lower bed, and fluidizing gas is introduced to the lower bed and thence passes to the upper bed counter to the flow of solids, resistance to gas flow between said beds decreasing the pressure above the upper bed to less than the pressure above the lower bed, a method of handling solids discharging from said lower bed comprising forming by fluo-static pressure of said lower bed a column of solids extending above the location at which they discharge from the lower bed, introducing fluidizing gas into said column, subjecting the upper face of said column to the smaller pressure prevalent above said upper bed to raise the level of solids in said column above the level attainable by fluo-static pressure alone, and discharging solids from said column.

6. A method as defined in claim 5 in which sufficient gas is introduced to said column to produce therein a higher superficial gas velocity than the superficial gas velocity in said lower bed to maintain the lower bed at a greater apparent density than the column and thus raise the level of solids in the column above the level in the lower bed.

7. A method as defined in claim 5 in which the gas introduced to said column subsequently comingles with the off-gas from said upper bed.

8. In an apparatus which includes upper and lower reactors adapted to house fluidized beds of finely divided solids, means for continuously feeding solids to said upper reactor and thence to said lower reactor, means for discharging solids at a controlled rate from the bottom of the bed in said lower reactor, means for continuously introducing fluidizing gas to said lower reactor and thence passing the gas to said upper reactor counter to the flow of solids, a standpipe connected to said discharging means and adapted to house a column of solids formed under the influence of fluo-static pressure of the bed in the lower reactor, means for introducing fluidizing gas into said standpipe, and means for receiving solids from said standpipe, the combination therewith of a device for raising the column of solids in said standpipe to a height greater than that attainable by fluo-static pressure alone comprising means for transmitting a lower pressure to the top of column than that to which the bed in said lower reactor is subjected.

9. A combination as defined in claim 8 in which said upper and lower reactors are physically one above the other.

10. In an apparatus which includes upper and lower reactors adapted to house fluidized beds of finely divided solids, means for continuously feeding solids to said upper reactor and thence to said lower reactor, means for discharging solids at a controlled rate from the bottom of the bed in said lower reactor, means for continuously introducing fluidizing gas to said lower reactor and thence passing the gas at reduced pressure to said upper reactor counter to the flow of solids, a standpipe connected to said discharging means and adapted to house a column of solids formed under the influence of fluo-static pressure of the bed in the lower reactor, means for introducing fluidizing gas into said standpipe, and means for receiving solids from said standpipe, the combination therewith of a device for raising the column of solids in said standpipe to a height greater than that attainable by fluo-static pressure alone comprising a pressure transmitting conduit connected to the upper portion of said standpipe and to said upper reactor above the bed therein to subject the upper face of the column to the smaller pressure prevalent above the upper bed.

11. In an apparatus which includes upper and lower reactors adapted to house fluidized beds of finely divided solids, means for continuously feeding solids to said upper reactor and thence to said lower reactor, means for discharging solids at a controlled rate from the bottom of the bed in said lower reactor, means for continuously introducing fluidizing gas to said lower reactor and thence passing the gas at reduced pressure to said upper reactor counter to the flow of solids, a standpipe connected to said discharging means and adapted to house a column of solids formed under the influence of fluo-static pressure of the bed in the lower reactor, multiple means for introducing sufficient fluidizing gas into said standpipe to produce therein a higher superficial gas velocity than the superficial velocity of gas in said lower reactor, whereby the resulting density difference raises the column of solids in said standpipe to a greater height than the bed in said lower reactor, and a stripping tower adapted to receive solids from said standpipe, the combination therewith of a device for raising the column of solids to a height greater than that attainable by fluo-static pressure aided only by differences in density comprising a pressure transmitting conduit connected to the upper portion of said standpipe and to said upper reactor above the bed therein to subject the upper face of the column to the smaller pressure prevalent above the upper bed.

12. In a direct reduction process for iron ore wherein finely divided ore feeds continuously to an upper bed and thence to a lower bed and discharges from the bottom of said lower bed, and preheated gas for fluidizing said beds and reducing the ore is introduced to the lower bed and thence passes to the upper bed counter to the ore flow, resistance to gas flow between said beds decreasing the pressure above the upper bed to less than the pressure above the lower bed, a method of handling reduced product discharging from said lower bed comprising forming by fluo-static pressure of said lower bed a column of reduced product extending above the location at which the product discharges from the lower bed, introducing fluidizing gas into said column, subjecting the upper face of said column to the smaller pressure prevalent above said upper bed to raise the level of product in said column above the level attainable by fluo-static pressure alone, the gases introduced to said lower bed and to said column being of similar composition and subsequently commingling, and discharging product from said standpipe.

13. A method as defined in claim 12 in which sufficient gas is introduced to said column to produce therein a higher superficial gas velocity than the superficial gas velocity in said lower bed to maintain the lower bed at a greater apparent density than the column and thus raise the level of product in the column above the level in the lower bed.

References Cited in the file of this patent

UNITED STATES PATENTS 2,477,454     Heath _____ July 29, 1949

OTHER REFERENCES

Badger et al.: Elements of Chemical Engineering (1936), 2nd edition, McGraw-Hill Book Company, Inc., New York (pages 20–22; page 20, Fig. 6A relied upon).